(12) United States Patent
Nakano et al.

(10) Patent No.: US 11,737,388 B2
(45) Date of Patent: Aug. 29, 2023

(54) CUTTING BLADE PIECE PROTECTIVE STRUCTURE, BLADE GUARD AND LAWN MOWER

(71) Applicant: YAMABIKO CORPORATION, Tokyo (JP)

(72) Inventors: Kenji Nakano, Tokyo (JP); Ryota Yamada, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 699 days.

(21) Appl. No.: 16/667,919

(22) Filed: Oct. 30, 2019

(65) Prior Publication Data
US 2020/0128730 A1 Apr. 30, 2020

(30) Foreign Application Priority Data
Oct. 31, 2018 (JP) .................................. 2018-204804

(51) Int. Cl.
*A01D 34/73* (2006.01)
*A63B 57/50* (2015.01)
*A01D 34/00* (2006.01)
*A01D 101/00* (2006.01)

(52) U.S. Cl.
CPC ............ *A01D 34/73* (2013.01); *A01D 34/008* (2013.01); *A01D 2101/00* (2013.01); *A63B 57/50* (2015.10)

(58) Field of Classification Search
CPC ...... A61B 57/50; A01D 34/73; A01D 34/828; A01D 34/736; A01D 34/008; A01D 2101/00; A01D 34/84; A01D 34/863; A01G 3/053; Y10S 56/20; Y10S 56/17

USPC ...... 56/320.1, 297, 158, 232–236, 255, 257, 56/264, 295; 30/355, 196, 216–220, 225; 83/855, 854
See application file for complete search history.

(56) References Cited

U.S. PATENT DOCUMENTS

| | | | | |
|---|---|---|---|---|
| 3,877,146 A | * | 4/1975 | Pittinger | A01D 34/73 30/DIG. 5 |
| 5,715,663 A | * | 2/1998 | Getz | A01D 34/665 56/6 |
| 7,290,383 B2 | * | 11/2007 | Harris | A01D 34/736 56/255 |

(Continued)

FOREIGN PATENT DOCUMENTS

| | | | | |
|---|---|---|---|---|
| DE | 202006008527 U1 | * | 7/2006 | ........... A01D 34/736 |
| DE | WO 2011154557 A1 | * | 12/2011 | ........... A01D 34/733 |

(Continued)

*Primary Examiner* — Ghassem Alie
(74) *Attorney, Agent, or Firm* — HAUPTMAN HAM, LLP

(57) ABSTRACT

A cutting blade piece protective structure that prevents an obstacle from coming into direct contact with a blade portion of a cutting blade piece, saving light weight, saving a replacement cost at the time of breakage, and inhibiting lawn mowing performance by the cutting blade piece, is provided, and the lawn mower that includes the blade disk to be rotationally driven and at least one cutting blade piece attached to the outer peripheral portion of the blade disk, a blade guard for preventing an obstacle from coming into contact with the blade portion of the cutting blade piece is provided on the cutting blade piece. Preferably, the blade guard is attachable to and detachable from the cutting blade piece.

7 Claims, 7 Drawing Sheets

(56) References Cited

U.S. PATENT DOCUMENTS

| | | | | |
|---|---|---|---|---|
| 8,893,461 B2 * | 11/2014 | Nikkel | .................. | A01D 34/733 |
| | | | | 56/255 |
| 2006/0168933 A1 * | 8/2006 | Hill, Jr. | .................. | A01D 34/73 |
| | | | | 56/295 |
| 2016/0278289 A1 * | 9/2016 | Kasai | ................... | A01D 34/736 |

FOREIGN PATENT DOCUMENTS

| | | | | |
|---|---|---|---|---|
| DE | 102014012322 A1 * | 8/2014 | ........... | A01D 34/736 |
| DE | WO 2017/025673 A1 * | 2/2017 | ........... | A01D 34/733 |
| EP | 1211924 B1 | 9/2004 | | |
| JP | S50-137231 U | 11/1975 | | |
| JP | H5-31526 U | 4/1993 | | |
| JP | H7-30006 U | 6/1995 | | |
| JP | 3143570 U | 7/2008 | | |
| JP | 2016-185099 A | 10/2016 | | |

\* cited by examiner

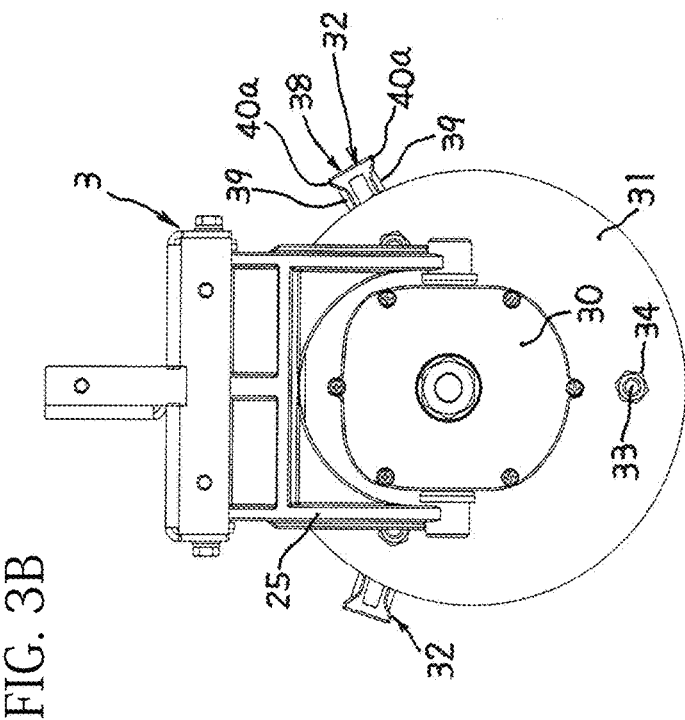
FIG. 3A
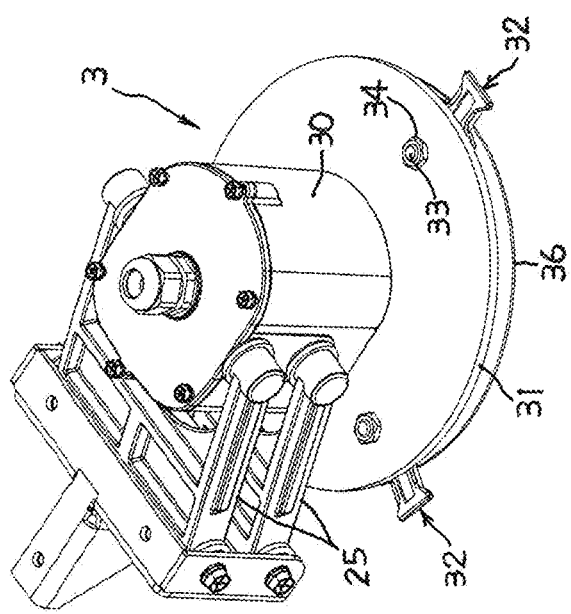
FIG. 3B
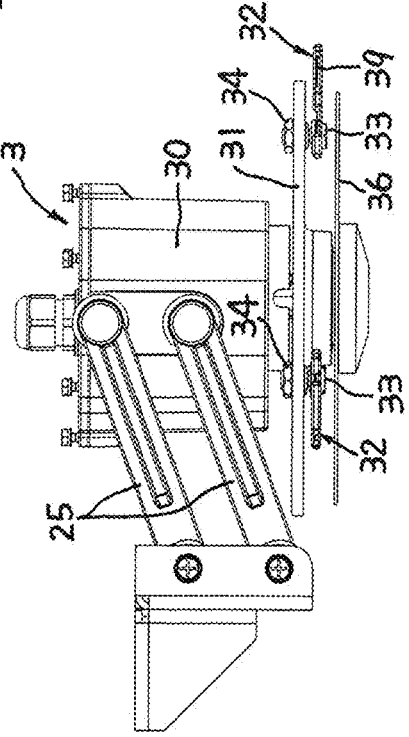
FIG. 3C
FIG. 3D

CUTTING BLADE PIECE PROTECTIVE STRUCTURE, BLADE GUARD AND LAWN MOWER

RELATED APPLICATIONS

The present application claims priority to Japanese Patent Application Number 2018-204804, filed Oct. 31, 2018, the disclosure of which is hereby incorporated by reference herein in its entirety.

BACKGROUND OF THE INVENTION

The present invention relates to a cutting blade piece protective structure in a lawnmower, and particularly relates to a blade piece protective structure for protecting a cutting blade piece from an obstacle during lawn mowing work. The present invention also relates to a blade guard as a component of a cutting blade piece protective structure. Further, the present invention relates to a lawnmower having a cutting blade piece protective structure or a blade guard.

BACKGROUND ART

As one type of lawnmower, there has been known a lawnmower having the following configuration as described in Patent Document 1, Patent Document 2, and the like. The lawnmower includes a blade disk to be rotationally driven, and a plurality of thin plate-shaped cutting blade pieces are supported on an outer peripheral portion of the blade disk in a state of play. By the centrifugal force when the blade disk is rotated, each cutting blade piece projects radially from the outer periphery of the blade disk, and the grass is cut by the cutting blade piece. Such a configuration is often adopted in a so-called robotic lawnmower that performs work in an unmanned self-propelled manner.

Similar to other types of lawnmower and grass mower, in the lawnmower having the above configuration, since the cutting blade piece is broken when the cutting blade piece comes into contact with an obstacle such as stones during operation, a measure to prevent damage to the cutting blade piece is required. In the lawnmower having the above configuration, since the cutting blade piece has a thin plate shape such as a razor blade, protection of the cutting blade piece is particularly important.

When the lawnmower work is performed in a field where the golf ball falls, such as a golf practice field, the golf ball also becomes an obstacle to the lawn mowing work. When the cutting blade pieces come into contact with the golf ball, damage to the surface of the golf ball is caused not only by the breakage of the cutting blade piece but also the golf ball becomes unsuitable for use.

Therefore, in the related art, as described in FIG. 2 of Patent Document 2, a protective plate for protecting a cutting blade piece from an obstacle such as a stone or a golf ball is disposed below the blade disk. The protective plate is formed in a thin plate shape as a whole from the viewpoint of suppressing the weight and cost of the lawnmower. The protective plate is free from rotation of the blade disk. As described in FIG. 1 of Patent Document 2, the protective plate includes a disk disposed concentrically with the blade disk, and a prong-shaped extending portion formed on the outer periphery of the disk. The disk is smaller in diameter than the blade disk or smaller than the blade disk, and the prong-shaped extension portion extends outward from the cutting blade piece protruding from the blade disk. The prong-shaped extending portion prevents contact of an obstacle with respect to the cutting blade piece while allowing the cutting of the grass by the cutting blade piece.

PRIOR ART DOCUMENTS

[Patent Document]
[Patent Document 1] JP 2016-185099
[Patent Document 2] European Patent number 1211924

SUMMARY OF INVENTION

Technical Problem

However, the conventional cutting blade piece protective structure has many problems as follows. Since the protective plate has a thin plate shape, when an obstacle collides with the extending portion, the extending portion is easily deformed or broken. In order to increase the strength of the extending portion, the extending portion may be thick or the extending portion may be formed of a rigid material, but these coping methods increase the weight of the lawnmower. In addition, even when only a part of the protective plate is damaged, it is necessary to replace the entire protective plate, which is disadvantageous in terms of cost. Furthermore, since the protective plate is easy to corotate with the blade disk, the grass cutting performance by the cutting blade piece is likely to be impaired.

The present invention has been made in view of the above circumstances, and the present invention is directed to a lawnmower comprising a blade disk to be rotationally driven and at least one cutting blade piece attached to an outer peripheral portion of the blade disk, a cutting blade piece protective structure for preventing an obstacle from coming into direct contact with a blade portion of a cutting blade piece, an object of the present invention is to provide a cutting blade piece protective structure that is lightweight and hardly broken, can save the replacement cost at the time of breakage, and is difficult to inhibit the grass cutting performance by the cutting blade piece.

The present invention also attempts to provide a suitable blade guard for use as a component of the blade piece protective structure.

Further, an object of the present invention is to provide a lawnmower having the cutting blade piece protective structure or the blade guard.

Means to Solve the Problem

In order to solve the above problems, the blade guard according to a first aspect of the present disclosure is characterized in that in a lawnmower comprising a blade disk to be rotationally driven and at least one cutting blade piece attached to an outer peripheral portion of the blade disk, wherein a blade guard for preventing an obstacle from coming into contact with a blade portion of the cutting blade piece is provided on the cutting blade piece.

The blade guard according to a second aspect of the present disclosure is configured to prevent contact of an obstacle to the blade portion of the cutting blade piece.

The blade guard according to a third aspect of the present disclosure includes a convex portion protruding, relative to the blade portion, forward in a rotation direction of the blade disk and at a position corresponding to a tip end of the blade portion.

The blade guard according to a fourth aspect of the present disclosure further includes at least one convex portion on a rear side of the convex portion, and the at least one convex portion protrudes, relative to the blade portion, forward in the rotation direction of the blade disk, and the blade portion extends between the adjacent convex portions.

In the blade guard according to a fifth aspect of the present disclosure, an interval between the adjacent convex portions is an interval that can prevent a golf ball as the obstacle from coming into contact with the blade portion.

In the blade guard according to a sixth aspect of the present disclosure the blade disk is rotatable in both forward and reverse directions, and the blade portion and the blade guard are disposed both before and after the rotation direction of the blade disk in the cutting blade piece.

The blade guard according to a seventh aspect of the present disclosure is configured to be attachable to and detachable from the cutting blade piece.

The blade guard according to an eighth aspect of the present disclosure further comprises a cutting blade piece receiving portion and a cutting blade piece engaging portion, the cutting blade piece engaging portion locks the cutting blade piece so as not to be released in a state in which the cutting blade piece is received in the cutting blade piece receiving portion, and releasable the engagement of the cutting blade piece, wherein locking and unlocking of the cutting blade piece by the cutting blade piece engaging portion are made possible by elastic deformation of at least a portion of the blade guard.

A lawnmower according to a ninth aspect of the present disclosure is characterized by comprising the blade guard according to the first aspect of the present disclosure.

Effect of the Invention

According to the first and the second aspects of the present invention, the cutting blade piece cuts grass by the rotation of the blade disk. Since the blade guard for preventing the obstacle from coming into contact with the blade portion of the cutting blade piece is provided in the cutting blade piece, the obstacle is prevented from coming into direct contact with the blade portion of the cutting blade piece, and the blade portion of the cutting blade piece is protected. Since the blade guard is provided for each of the cutting blade pieces, it is difficult to reduce the weight of the lawnmower even if measures to increase the strength of the blade guard are taken. Further, since the blade guard is provided for each cutting blade piece, replacement of the blade guard when the blade guard is damaged can be performed for each cutting blade piece, and the replacement cost can be saved. Furthermore, since the configuration is different from the conventional configuration, it is difficult to inhibit the grass cutting performance by the cutting blade piece.

According to the third aspect of the present invention, the obstacle is prevented from coming into direct contact with the blade portion of the cutting blade piece when the obstacle comes into contact with the convex portion.

According to the fourth aspect of the present invention, when the interval between adjacent convex portions is narrowed, it is possible to prevent a smaller obstacle from coming into contact with the blade portion.

According to the fifth aspect of the present invention, since the golf ball can be prevented from coming into contact with the blade portion, damage to the golf ball by the cutting blade piece can be prevented when the lawnmower work is performed in the field where the golf ball falls.

According to the sixth aspect of the present invention, even when the blade disk is driven to rotate in the forward and reverse directions, the grass cutting operation can be performed by the cutting blade, and the blade guard can protect the cutting blade piece. Therefore, the life of the cutting blade piece is doubled compared with the case where the cutting blade piece is one blade.

According to the seventh aspect of the present invention, since the blade guard for replacement can be replaced with a new one, the worn blade guard can be replaced with a new one, which is suitable for use in a long period of use of the cutting blade piece. Further, by preparing a plurality of blade guards having varied shape, i.e., each of blade guards have a different shape according to the situation of the work site, there is an advantage that an optimal blade guard can be selected and used in accordance with the situation of the work site.

According to the eighth aspect of the present invention, since the engagement and disengagement of the cutting blade piece by the cutting blade piece engaging portion is made possible by the elastic deformation of at least a portion of the blade guard, the blade guard can be quickly attached to and detached from the cutting blade piece by a simple operation. Therefore, the blade guard can be easily replaced.

According to the ninth aspect of the present invention, the operation and effect of the blade guard is obtained.

BRIEF DESCRIPTION OF THE DRAWINGS

FIG. 3A is a perspective view of an operating unit in the lawnmower of FIGS. 2A and 2B.

FIG. 3B is a plan view of an operating unit in the lawnmower of FIGS. 2A and 2B.

FIG. 3C is a side view of an operating unit in the lawnmower of FIGS. 2A and 2B.

FIG. 3D is a front view of an operating unit in the lawnmower of FIGS. 2A and 2B.

DESCRIPTION OF THE PREFERRED EMBODIMENTS

Embodiments of the present invention will be described below with reference to the accompanying drawings.

Figure 1:
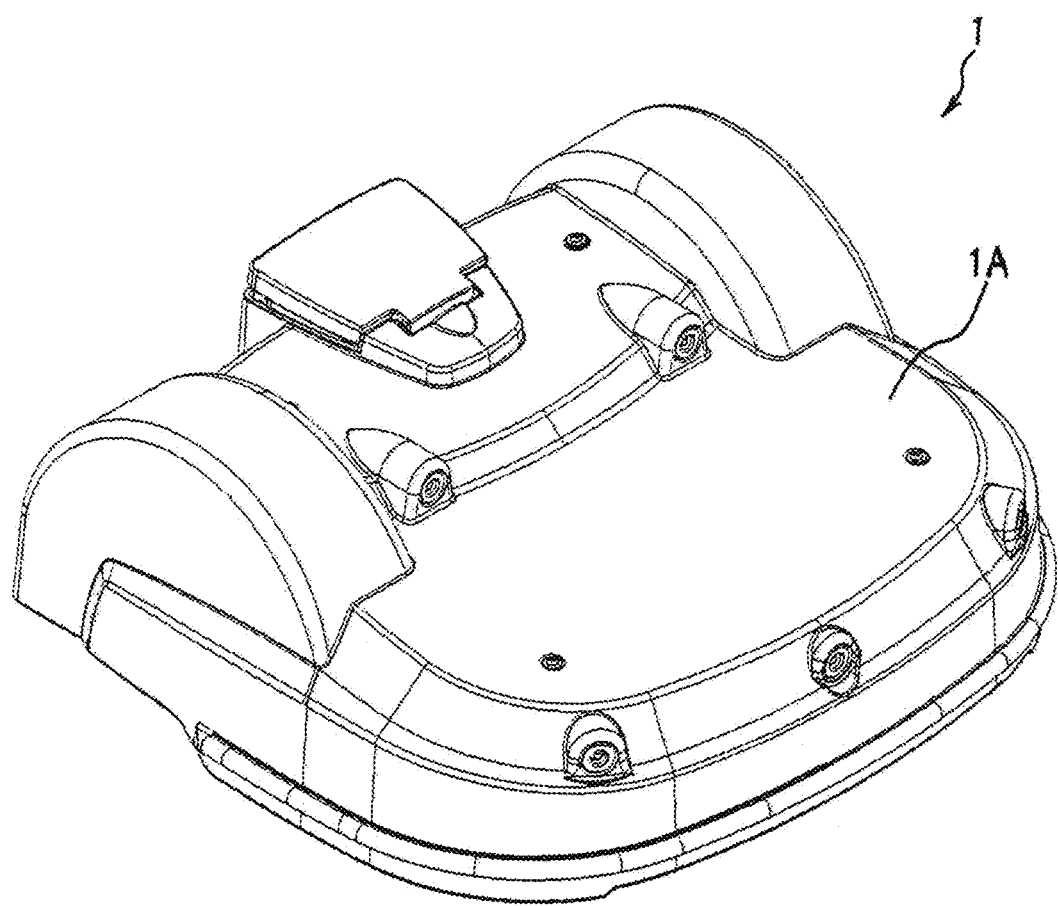
FIG. 1 is an overall perspective view of a lawnmower as an example of a cutting blade piece protective structure and a blade guard according to an embodiment of the present invention.

The lawnmower 1 of FIG. 1 is of an unmanned self-propelled type, and grass of a field is cut to a predetermined height while traveling in a field. The lawnmower 1 includes a body cover 1A opened downward, and a traveling machine body 2 and an operating unit 3, which will be described later, are disposed inside the machine body cover 1A.

Figure 2A:
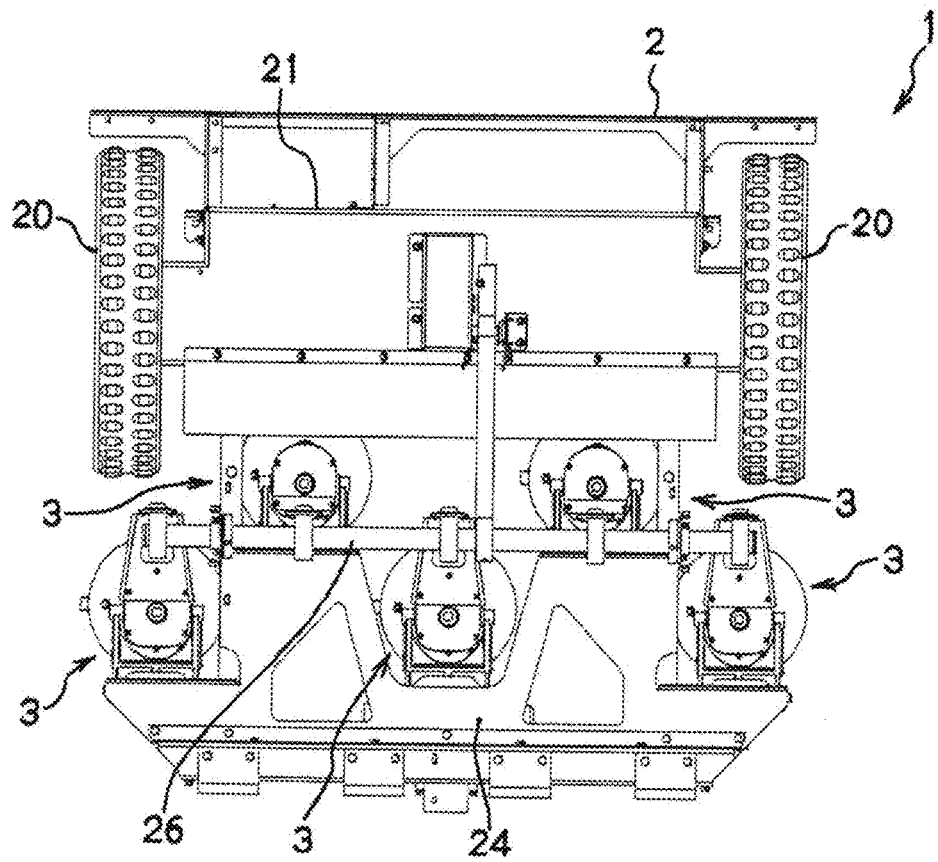
FIG. 2A is a plan view showing an internal structure of the lawnmower of FIG. 1.
Figure 2B:
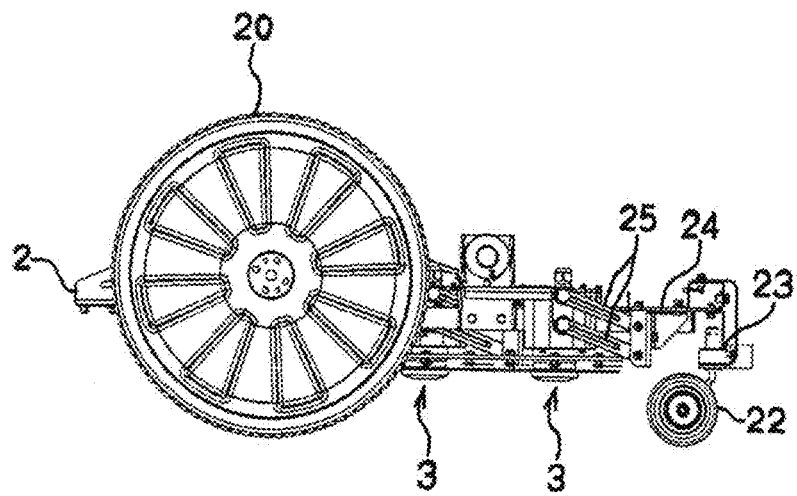
FIG. 2B is a side view showing an internal structure of the lawnmower of FIG. 1.

FIGS. 2A and 2B are plan views of the body cover 1A shown in FIG. 1, showing the internal structure of the lawnmower 1. The lawnmower 1 includes a traveling machine body 2 constituting a traveling unit and the operating unit 3 mounted on the traveling machine body 2. The traveling machine body 2 includes a frame 24, a pair of left and right driving wheels 20, a driving unit 21 for driving the driving wheels 20, a pair of left and right steering wheels 22, a steering adjusting unit 23 for controlling the steering wheels 22, and the like.

The operating unit 3 is attached to the frame 24 so as to be capable of adjusting the vertical height. In the illustrated example, five operating units 3 are mounted on the traveling machine body 2, but the number of the operating units 3 may be set as appropriate. In the illustrated example, each operating unit 3 is arranged so as to be able to move up and down with respect to the frame 24 via a parallel link 25. All the operating units 3 are connected by a connecting frame 26, and the vertical height thereof can be adjusted integrally with each other. The vertical height of the operating unit 3 is appropriately adjusted according to the lawn mowing height.

The operating unit 3 performs lawn mowing work, and includes a motor 30 and a blade disk 31 driven to rotate by the motor 30, as shown in FIGS. 3A, 3B, 3C and 3D. The motor 30 includes a drive shaft disposed in a downward vertical direction, and the drive shaft is attached to the center of the blade disk 31. The blade disk 31 rotates in a plane of rotation orthogonal to the drive shaft, and is rotationally driven in a state where the rotation surface of the blade disk 31 is opposed to the field.

At least one defensive cutting blade piece 32 is swingably attached to the lower surface of the outer peripheral portion of the blade disk 31. As will be described in detail later, the defensive cutting blade piece 32 is a cutting blade piece to which a protective function is imparted from an obstacle such as stone. The defensive cutting blade piece 32 is swingably and detachably attached to the blade disk 31 by an appropriate fitting including a bolt 33 such as a stepped bolt and a nut 34, for example. An attachment hole 35 (see FIGS. 4A, 4B, 4C and 4D) into which the bolt 33 for attachment is inserted is formed in the defensive cutting blade piece 32.

In the example of FIGS. 3A, 3B, 3C and 3D, three defensive cutting blade pieces 32 are provided at equiangular intervals with respect to the blade disk 31, but the number of the defensive cutting blade pieces 32 may be larger or smaller. As shown in FIGS. 3C and 3D, a thin protective plate 36 is provided below the blade disk 31 to protect the defensive cutting blade piece 32 from a collision with the ground or the like. The protection plate 36 is disposed concentrically with the blade disk 31 and is free to rotate from the blade disk 31. The diameter of the protection plate 36 is smaller than the diameter of the rotation region of the defensive cutting blade piece 32 due to the rotation of the blade disk 31. A substantially lawn mowing operation is performed by a blade portion 39 located radially outward of the protective plate 36 in the defensive cutting blade piece 32.

The defensive cutting blade piece 32 is oriented in the radial direction of the blade disk 31 by centrifugal force due to the rotation of the blade disk 31, and protrudes to the outside of the blade disk 31. This posture shown in FIGS. 3A, 3B, 3C and 3D is the lawnmower posture of the guard mowing blade piece 32. During the lawn mowing work, the defensive cutting blade piece 32 always moves within the minute angle range by receiving the resistance of the lawn and the centrifugal force due to the rotation of the blade disk 31. When the defensive cutting blade piece 32 receives a large resistance during the operation, the defensive cutting blade piece 32 is retracted to the side opposite to the rotating direction of the blade disk 31 so as to escape from the resistance. When the resistance disappears, the defensive cutting blade piece 32 returns to the original lawnmower posture again by centrifugal force due to the rotation of the blade disk 31.

As shown in FIGS. 4A, 4B, 4C and 4D, each of the defensive cutting blade pieces 32 includes a cutting blade piece 37 and a blade guard 38 provided on the cutting blade piece 37. As shown in FIG. 5, the cutting blade piece 37 has a rectangular thin plate shape, and is a sharp cutting tool such as a razor blade. For this reason, it is suitable for lawn mowing work in a field having a soft lawn, such as a golf course, a soccer field, a land playing field, a park, a home garden, or the like. The attachment hole 35 to the blade disk 31 is formed at one end of the cutting blade piece 37, and two long sides of the cutting blade piece 37 are the blade portions 39.

In the present embodiment, the cutting blade piece 37 is composed of both double-edged blades, and correspondingly, the motor 30 is configured to be rotatable forward and reverse directions. Therefore, even when the motor 30 is rotated in the forward and reverse directions, the grass cutting operation by the cutting blade piece 37 can be performed. Therefore, the life of the cutting blade piece 37 is doubled compared with the case where the cutting blade piece 37 is single-edge blade.

As shown in FIGS. 4A, 4B, 4C and 4D, the cutting blade piece 37 is provided with a blade guard 38 that prevents an obstacle such as stone from coming into contact with the blade portions 39 of the cutting blade piece 37. The blade guard 38 is formed of, for example, a material having impact resistance and wear resistance, such as a metal or a synthetic resin. The blade guard 38 protects the blade portion 39 of the cutting blade piece 37. The blade guard 38 is provided for each cutting blade piece 37. Therefore, even if the blade guard 38 is thickened or the blade guard 38 is formed of a rigid material in order to increase the strength of the blade guard 38, the weight of the lawnmower 1 is less likely to be increased. Further, since the blade guard 38 is provided for each of the cutting blade pieces 37, replacement when the blade guard 38 is damaged can be performed for each of the cutting blade pieces 37, and the replacement cost can be saved. Further, since the blade guard 38 rotates integrally with the cutting blade piece 37, the lawn mowing performance by the cutting blade piece 37 is not hindered.

In the present embodiment, the blade guard 38 is detachably attached to the cutting blade piece 37. Therefore, by preparing the blade guard for replacement, the blade guard worn by colliding with the obstacle can be replaced with a new blade guard. Therefore, it is preferable to cope with long-term use of the cutting blade piece. Further, by preparing a plurality of blade guards having varied shape, i.e., each of blade guards have a different shape according to the situation of the work site, there is an advantage that an optimal blade guard can be selected and used in accordance with the situation of the work site.

As shown in FIGS. 4A, 4B, 4C and 4D, the blade guard 38 includes a first convex portion 40a at a position corresponding to the tip of the blade portion 39 of the cutting blade piece 37. The first convex portion 40a protrudes forward in the rotational direction of the blade disk 31 from the blade portion 39. With this configuration, the obstacle is prevented from coming into direct contact with the blade portion 39 of the cutting blade piece 37 when the obstacle comes into contact with the first convex portion 40a.

As shown in FIGS. 4A, 4B, 4C and 4D, the blade guard 38 further includes at least one second convex portion 40b on the rear side of the first protrusion 40a. Each second convex portion 40b protrudes forward in the rotational direction of the blade disk 31 from the blade portion 39 of the cutting blade piece 37 similarly to the first convex portion 40a, and the blade portion 39 of the cutting blade piece 37 extends between the adjacent convex portions (between the first convex portion 40a and the second convex portion 40b, and between the adjacent second convex portions 40b). As described above, in the present embodiment, since the cutting blade piece 37 is made of both blades (e.g., a double-edge blade), the first convex portion 40a and the second convex portion 40b of the blade guard 38 are disposed on both sides of the cutting blade piece 37 so as to correspond to both the blade portions 39, 39 of the cutting blade piece 37.

Figure 7A:
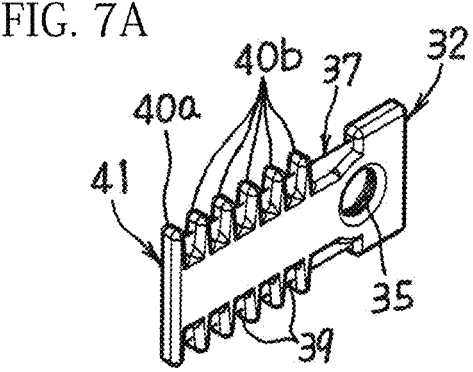
FIG. 7A is a perspective view of a blade guard constituting the cutting blade piece.
Figure 7B:
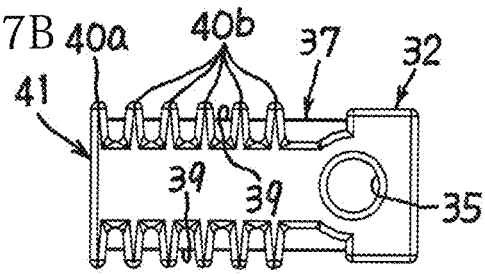
FIG. 7B is a plan view of a blade guard constituting the cutting blade piece.
Figure 7C:
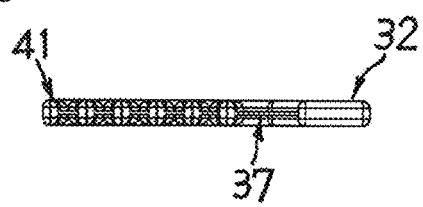
FIG. 7C is a side view of a blade guard constituting the cutting blade piece.
Figure 7D:
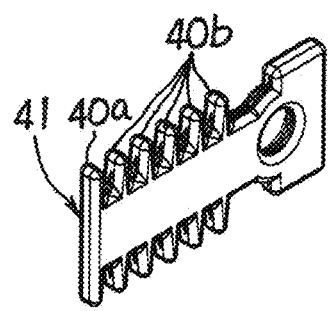
FIG. 7D is a plan view of a blade guard constituting the cutting blade piece.
Figure 7E:
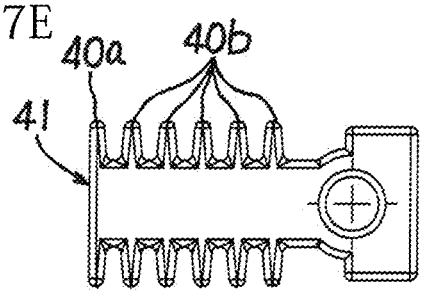
FIG. 7E is a plan view of a blade guard constituting the cutting blade piece.
Figure 7F:
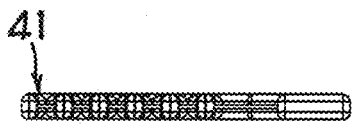
FIG. 7F is a side view of a blade guard constituting the cutting blade piece.

When an obstacle comes into contact with the first convex portion 40a or the second convex portion 40b of the blade guard 38, the obstacle is prevented from coming into direct contact with the blade portion 39 of the cutting blade piece 37. As shown in FIGS. 7A, 7B and 7C, as a comparative example of FIGS. 4A, 4B, 4C and 4D, if the interval between adjacent convex portions is narrowed, it is possible to prevent the blade portion 39 from coming into contact with a smaller obstacle. The blade guard 41 of FIGS. 7D, 7E and 7F is an example in which a large number of second convex portions 40b is formed at positions corresponding to the blade portions 39 of the cutting blade pieces 37 by forming a serrated notch in a sheath that can house the cutting blade pieces 37.

If the gap between adjacent convex portions is set to be an interval that can prevent the golf ball as an obstacle from coming into contact with the blade portion 39 of the cutting blade piece 37, it is possible to prevent the golf ball from coming into contact with the blade portion 39. Therefore, damage to the golf ball by the cutting blade piece 37 can be prevented when the lawnmower work is performed in a field where the golf ball falls, such as a golf practice field. As the distance between adjacent convex portions becomes narrower, the lawn mowing performance may be lowered. Therefore, in order to achieve both the protection of the golf ball and the maintenance of the lawn mowing performance, it is preferable to set the interval between the adjacent convex portions to a maximum distance within a range in which the golf ball can be prevented from coming into contact with the blade portion 39.

Figure 4A:
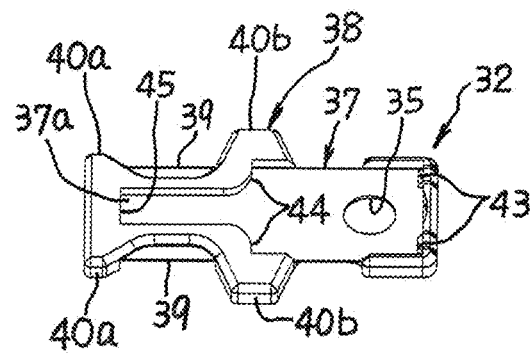
FIG. 4A is an enlarged perspective view of FIGS. 3A, 3B, 3C and 3D.
Figure 4B:
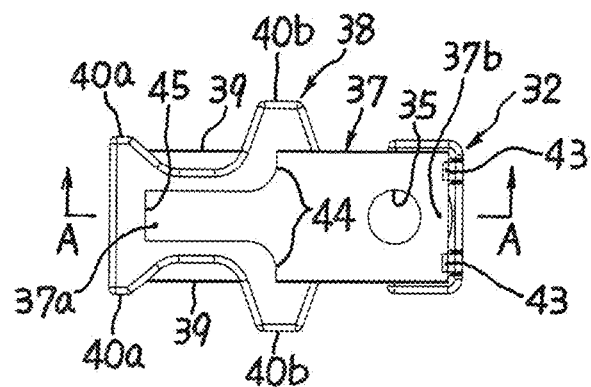
FIG. 4B is a plan view of FIGS. 3A, 3B, 3C and 3D.
Figure 4C:
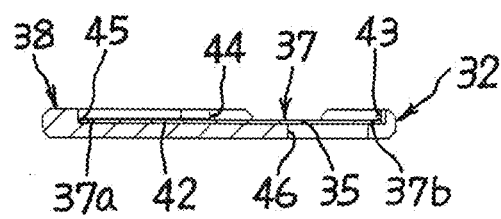
FIG. 4C is an arrow view of A-A line in FIG. 3B.
Figure 4D:
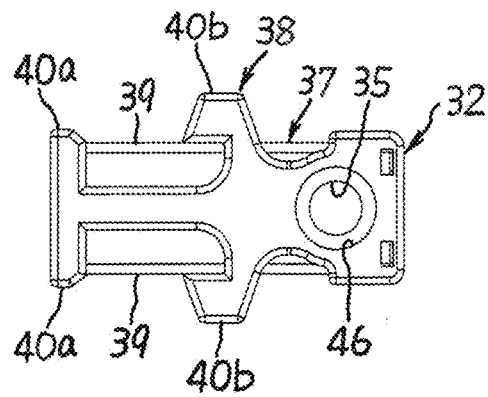
FIG. 4D is a back view of FIGS. 3A, 3B, 3C and 3D.
Figure 5:
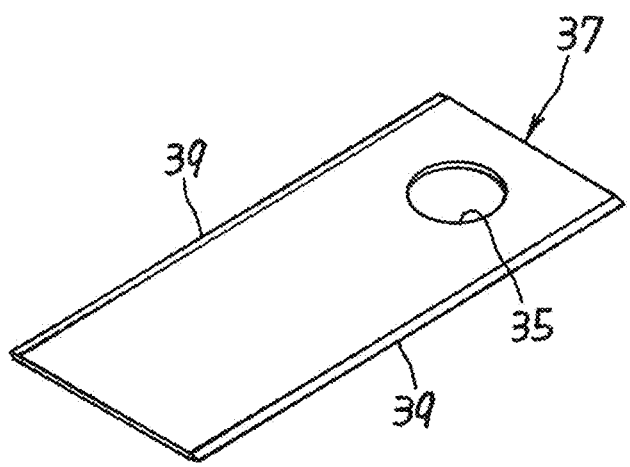
FIG. 5 is a perspective view of a cutting blade of FIGS. 4A, 4B, 4C and 4D.
Figure 6A:
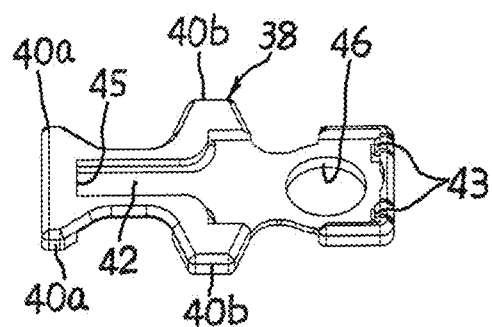
FIG. 6A is an enlarged perspective view of the blade guard constituting the defense cutting blade piece of FIG. 4A.
Figure 6B:
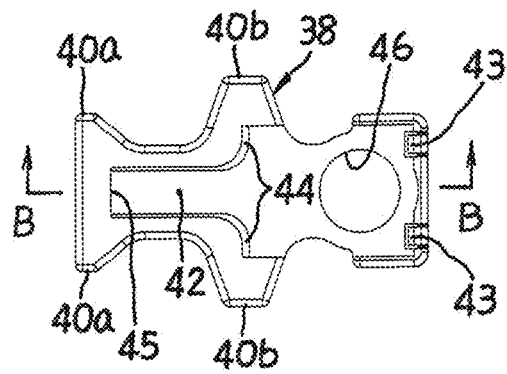
FIG. 6B is a plan view of the blade guard constituting the defense cutting blade piece of FIG. 4B.
Figure 6C:
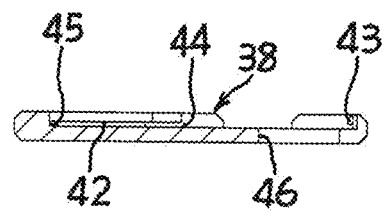
FIG. 6C is an arrow view of B-B line of the blade guard constituting the defense cutting blade piece of FIG. 4C.
Figure 6D:
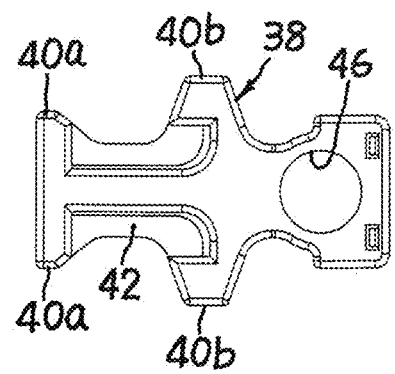
FIG. 6D is a back view of the blade guard constituting the defense cutting blade piece of FIG. 4D.

Next, a configuration in which the blade guard 38 of FIGS. 4A, 4B, 4C and 4D is detachably attached to the cutting blade piece 37 will be described. As shown in FIG. 6C, the blade guard 38 includes a cutting blade piece receiving portion 42 and a cutting blade piece engaging portion 43. As shown in FIG. 4C, the cutting blade piece engaging portion 43 can prevent the cutting blade piece 37 from slipping out in a state in which the cutting blade piece 37 is received in the cutting blade piece receiving portion 42, and can release the engagement of the cutting blade piece 37. Then, locking and unlocking of the cutting blade piece 37 by the cutting blade piece engaging portion 43 are made possible by elastic deformation of at least a portion of the blade guard 38.

Specifically, as shown in FIGS. 4A, 4B, 4C, 4D, 6A, 6B, 6C and 6D, the cutting blade piece receiving portion 42 defines a cutting blade piece accommodating space corresponding to the outer dimension (width, length, thickness) of the cutting blade piece 37. A cutting blade piece insertion opening 44 is formed at an intermediate position of the cutting blade piece receiving portion 42, a cutting blade piece stopper 45 is formed on one end side (left side in FIGS. 4A, 4B, 4C, 4D, 6A, 6B, 6C and 6D) of the cutting blade piece receiving portion 42, and a claw-shaped cutting blade piece engaging portion 43 is formed on the other end side (right side in FIGS. 4A, 4B, 4C, 4D, 6A, 6B, 6C and 6D) of the cutting blade piece receiving portion 42. The cutting blade piece 37 is inserted into the cutting blade piece receiving portion 42 by inserting one end part 37a of the cutting blade piece 37 from the cutting blade piece insertion opening 44 and inserting the cutting blade piece 37 into contact with the cutting blade piece stopper 45. As shown in FIG. 4C, in the housed state of the cutting blade piece 37 into the cutting blade piece receiving portion 42, the cutting blade piece engaging portion 43 is locked to the other end part 37b of the cutting blade piece 37 to prevent the cutting blade piece 37 from slipping out. In order to extract the cutting blade piece 37 from the blade guard 38, at least part of the elastic deformation of the blade guard 38 is used to release the engagement of the cutting blade piece engaging portion 43 with respect to the cutting blade piece 37. In this unlocked state, the cutting blade piece 37 can be pulled out from the cutting blade piece receiving portion 42 to the other end part 37b side.

According to the attachment/detachment structure of the blade guard 38 as described above, since the engagement and disengagement of the cutting blade piece 37 by the cutting blade piece engaging portion 43 is made possible by elastic deformation of at least a portion of the blade guard 38, the blade guard 38 can be quickly attached and detached with respect to the cutting blade piece 37 by a simple operation. Therefore, the blade guard 38 can be easily replaced.

As shown in FIGS. 4C, 4D, 6A, 6B, 6C and 6D, the blade guard 38 is provided with an attachment hole 46 at a position corresponding to the attachment hole 35 of the cutting blade piece 37. When the blade guard 38 is attached to the cutting blade piece 37, the attachment hole 35 of the cutting blade piece 37 and the attachment hole 46 of the blade guard 38 are concentrically positioned. Using these attachment holes 35, 46, the defensive cutting blade piece 32 is detachably attached to the blade disk 31 by the bolt 33 for mounting (see FIGS. 3A, 3B, 3C and 3D). The operation of attaching and detaching the blade guard 38 to the cutting blade piece 37 is performed in a state where the defensive cutting blade piece 32 is removed from the blade disk 31.

As another embodiment of the present invention, the following modified examples can also be employed.

(a) The rotation direction of the blade disk 31 is only one direction, and the blade guard 38 can have a shape corresponding to one blade (i.e., a single edge blade) with the cutting blade piece 37 as one blade.

(b) Other embodiment of lawnmowers to which the present invention is applied include lawnmowers that are operated or operated by an operator. For example, a riding type, a walk behind type, a portable type, and the like that perform lawn mowing while riding on a worker. The portable lawnmower includes, for example, a blade disk 31 at a front end portion of an operation rod extending in the front-rear direction of the operator, rotationally driving the blade disk 31 with a motor provided at the rear end portion of the operation rod, and performing lawn mowing while swinging the operation rod to the left and right.

(c) The present invention is also applicable to a lawnmower of a type in which the entirety of the defensive cutting blade piece 32 is viewed from above when the blade disk 31 is rotated and the lawn mowing operation is performed only within the range of the contour of the blade disk 31.

(d) As another aspect of the defensive cutting blade piece 32, a defensive cutting blade piece in which the blade guard and the cutting blade piece are integrally formed from the beginning may be adopted instead of the configuration in which the blade guard 38 is attached to the cutting blade piece 37.

(e) In place of the configuration in which the defensive cutting blade piece 32 is swingably disposed on the outer peripheral portion of the blade disk 31, a mode in which the defensive cutting blade piece is fixed to the outer peripheral portion of the blade disk in an immobile state can also be employed.

(f) In the illustrated example, the entire long side of the cutting blade piece 37 is defined as the blade portion 39 (see FIG. 5), and the blade guard 38 is provided so as to partially cover the blade portion 39 (see FIGS. 4A, 4B, 4C, 4D), and as another example, a cutting blade piece having no blade portion 39 may be employed in a portion covered with the blade guard 38.

(g) The second convex portion 40b may be omitted, and the blade guard having only the first convex portion 40a may be used. In this case, the first convex portion 40a collides with the obstacle, so that the blade portion 39 of the cutting blade piece 37 is protected. In this embodiment, since the blade portion 39 of the cutting blade piece 37 extends between the first convex portion 40a and the peripheral edge of the protective plate 36, the gap between the first convex portion 40a and the peripheral edge of the protective plate 36 can be prevented from being damaged by the blade portion 39.

While the embodiments of the present invention have been described in detail, the specific configurations are not limited to these embodiments, and modifications and the like may be made without departing from the scope of the present invention. In addition, the embodiments described above can be combined using each other as long as there is no inconsistency or problem particularly in the object, configuration, and the like. Furthermore, the lawnmower may include a cutting blade piece protective structure comprising a blade disk 31 to be rotationally driven and at least one cutting blade piece 37 attached to an outer peripheral portion of the blade disk 31, wherein a blade guard 38 for preventing an obstacle from coming into contact with a blade portion 39 of the cutting blade piece 37 is provided on the cutting blade piece 37.

What is claimed is:

1. A blade guard in a lawnmower comprising a blade disk to be rotationally driven and a cutting blade piece attached to an outer peripheral portion of the blade disk,
   wherein
   the blade guard is attachable on the cutting blade piece for preventing an obstacle from coming into contact with a blade portion of the cutting blade piece,
   the blade guard is detachable from the cutting blade piece when the cutting blade piece is attached to the outer peripheral portion of the blade disk,
   the blade guard is configured to be attached
   to the cutting blade piece to protect the blade portion of the cutting blade piece during a mowing operation in which the cutting blade piece is rotated with the blade disk,
   the blade guard includes
     a first protrusion protruding outward in a lateral direction of the blade guard,
     a second protrusion protruding outward in the lateral direction of the blade guard, and
     a recess between the first and second protrusions in a longitudinal direction of the blade guard, the recess being configured to expose a part of the blade portion of the cutting blade piece.

2. The blade guard according to claim 1, wherein
   the first protrusion of the blade guard is adapted to protrude, relative to the blade portion, forward in a rotation direction of the blade disk and at a position corresponding to a tip end of the blade portion.

3. The blade guard according to claim 2, wherein the second protrusion is located on a rear side of the first protrusion,
   the second protrusion is adapted to protrude, relative to the blade portion, forward in the rotation direction of the blade disk, and
   the second protrusion includes adjacent second protrusions configured such that the blade portion extends between the adjacent second protrusions.

4. The blade guard according to claim 3, wherein an interval between the adjacent second protrusions is an interval to prevent a golf ball as the obstacle from coming into contact with the blade portion.

5. The blade guard according to claim 1, wherein the blade portion and the blade guard are disposed in both forward and reverse rotation directions of the blade disk.

6. The blade guard according to claim 1, wherein
   the blade guard further comprises a cutting blade piece receiving portion and a cutting blade piece engaging portion,
   the cutting blade piece engaging portion is configured to lock the at least one cutting blade piece in a state in which the cutting blade piece is received in the cutting blade piece receiving portion, and
   the blade guard is configured to be elastically deformed to unlock the cutting blade piece from the cutting blade piece engaging portion.

7. A lawnmower comprising the blade guard according to claim 1.

\* \* \* \* \*